No. 713,483. Patented Nov. 11, 1902.
W. F. McNARY & F. P. WILEY.
STOOL.
(Application filed Feb. 24, 1902.)

(No Model.)

Witnesses
Alfred D. Eicker
Frank Turner

Inventors
Wm. F. McNary
Frank P. Wiley
by Higdon & Longan attys

UNITED STATES PATENT OFFICE.

WILLIAM F. McNARY AND FRANK P. WILEY, OF ST. LOUIS, MISSOURI.

STOOL.

SPECIFICATION forming part of Letters Patent No. 713,483, dated November 11, 1902.

Application filed February 24, 1902. Serial No. 95,216. (No model.)

*To all whom it may concern:*

Be it known that we, WILLIAM F. MCNARY and FRANK P. WILEY, of the city of St. Louis, State of Missouri, have invented certain new and useful Improvements in Stools, of which the following is a full, clear, and exact description, reference being had to the accompanying drawings, forming a part hereof.

This invention relates to stools; and it consists of the novel construction, combination, and arrangement of parts hereinafter shown, described, and claimed.

Our object is to construct a stool especially for the use of motormen and for similar purposes; and our invention consists of four supporting-legs, a seat connecting the upper ends of the supporting-legs, a bottom connecting the lower ends of the supporting-legs, suitable walls connecting the supporting-legs and inclosing the legs and bottom to form a box, a door providing access to the box, and folding foot-rests connected to the supporting-legs.

Figure 1:
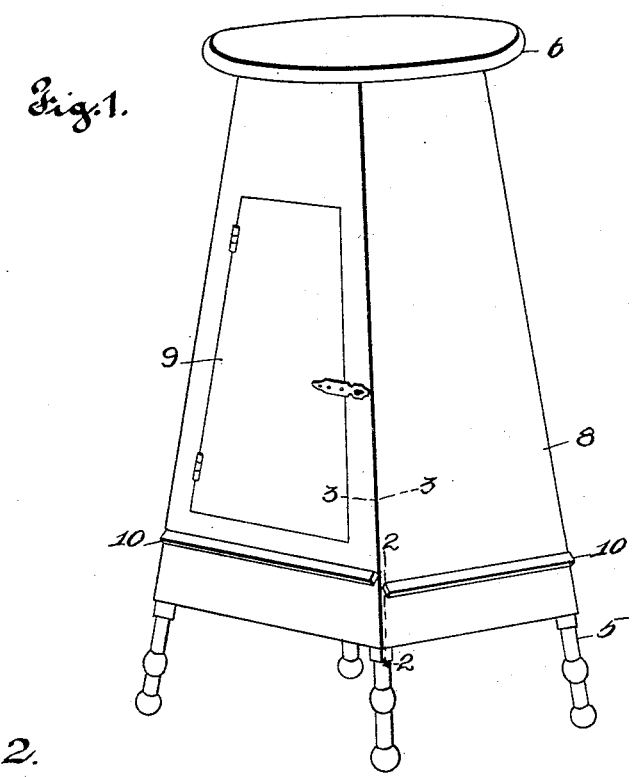
Figure 2:
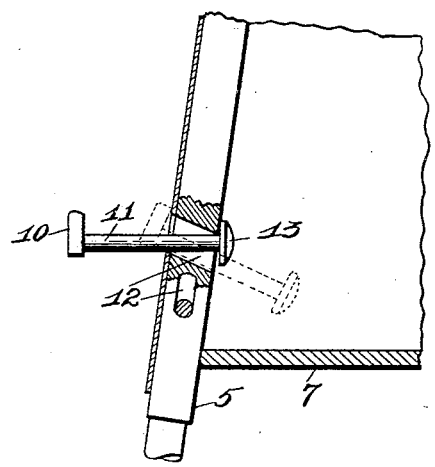
Figure 3:
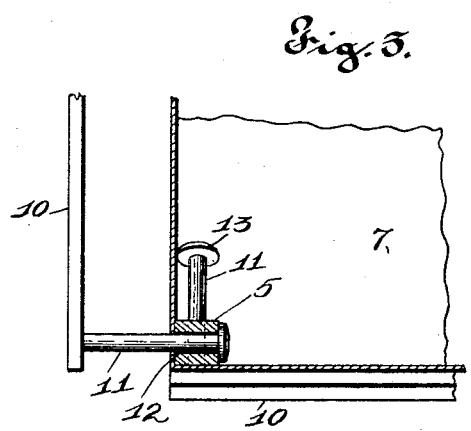

Figure 1 is a perspective view of the stool embodying our invention. Fig. 2 is a vertical sectional detail on the line 2 2 of Fig. 1 looking in the direction indicated by the arrow, parts being broken away to economize space. Fig. 3 is a horizontal sectional detail on the lines 3 3 of Figs. 1 and 2 and looking downwardly.

Referring to the drawings in detail, the supporting-legs 5 are connected at the top by the seat 6 and near their lower ends by the bottom 7. The walls 8 inclose the legs and bottom as required to form a box, and the door 9 provides access to the box. A folding foot-rest 10 is provided for each of the four sides of the stool, said foot-rests being constructed as shown in detail in Figs. 2 and 3. Each foot-rest consists of a bar having arms 11 extending from its ends through openings 12, formed in the supporting-legs 5, and weighted heads 13 upon the inner ends of the arms to prevent said arms from being withdrawn from said openings 12 and to counterbalance the weight of the bars 10, as required to hold the foot-rest in its folded position, as shown in dotted lines in Fig. 2. The arms 11 of one foot-rest cross the arms 11 of the adjacent foot-rest, as shown in Figs. 2 and 3.

As before suggested, the stool is especially designed for the use of motormen in operating street-cars and for similar purposes. The box provides a convenient place for carrying the motorman's tools and other articles. The stool is compact and portable to the highest degree, and the folding foot-rests are convenient for use and are entirely out of the way when their use is not desired.

The openings 12, formed through the supporting-legs, are inclined downwardly from the outer faces of the legs and are considerably larger than the arms 11, so that said arms will slide freely in said openings. When the foot-rest is in use, the arms 11 occupy a horizontal position, as shown in Figs. 2 and 3, and when the foot-rest is folded the arms 11 are inclined downwardly, as shown in dotted lines in Fig. 2, the weights 13 overbalancing the foot-rest and holding it against the wall 8.

We claim—

In a stool, suitable supporting-legs having transverse openings, a foot-rest, arms extending from the foot-rest and slidingly mounted in said openings, and weighted heads upon the inner ends of said arms to counterbalance the foot-rest and to hold the arms from being withdrawn from the openings, substantially as specified.

In testimony whereof we affix our signatures in presence of two witnesses.

WILLIAM F. McNARY.
FRANK P. WILEY.

Witnesses:
ALFRED A. EICKS,
JOHN C. HIGDON.